April 15, 1924.

A. STUCKI 1,490,492

ROLLER SIDE BEARING

Filed May 11, 1923

WITNESSES

INVENTOR

Arnold Stucki
By Winter & Brown
his attys.

Patented Apr. 15, 1924.

1,490,492

UNITED STATES PATENT OFFICE.

ARNOLD STUCKI, OF PITTSBURGH, PENNSYLVANIA.

ROLLER SIDE BEARING.

Application filed May 11, 1923. Serial No. 638,264.

*To all whom it may concern:*

Be it known that I, ARNOLD STUCKI, a citizen of the United States, and a resident of Pittsburgh, in the county of Allegheny and State of Pennsylvania, have invented a new and useful Improvement in Roller Side Bearings, of which the following is a specification.

This invention relates to side bearings, and particularly to side bearings for railway cars in which one bearing surface or wear plate is affixed to the truck while the remaining one is attached to the car body.

It is an object of the invention to provide a bearing of this type which is simple in construction, contains but a few parts, is easy and economical to manufacture, is highly effective in operation, and is self-cleaning.

It is a special object to provide a bearing in which the cage for retaining the roller in position is composed of but two cooperating parts, one of which is fastened to the truck bolster and the other to the car body, the former providing end walls for the cage while the latter provides the side walls thereof, the side walls embracing the roller and the end walls.

It is another special object to provide a bearing of the character referred to in which both the upper and lower wear plates may be formed integrally with the corresponding portions of the cage, and in which both portions of the cage may be fabricated by rolling instead of by casting or other similar expensive and objectionable processes now commonly employed.

It is still a further special object to construct the entire cage for the bearing from a pair of rolled U-shaped channel sections normally disposed eccentrically to each other upon their respective supporting bolsters whereby to secure an automatic positioning of the roller within the cage after the upper bearing surface contacts the roller and during subsequent swiveling movement between the truck and car body.

These and other objects of the invention will more fully appear when taken in conjunction with the following description and the appended claims.

Figure 1:
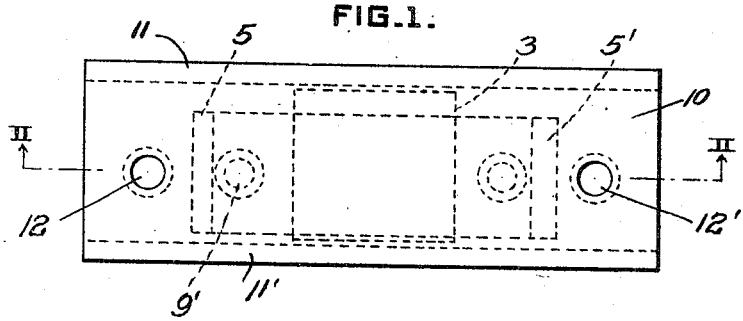
Figure 2:
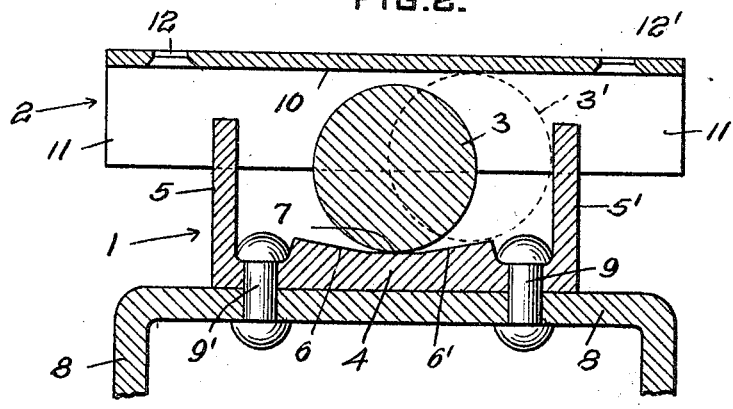
Figure 3:
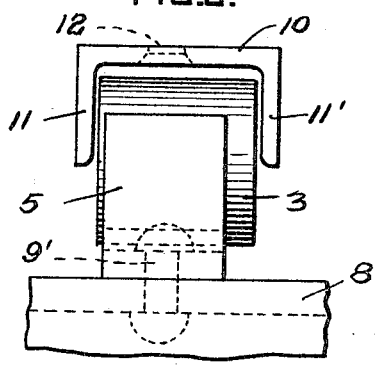

In the accompanying drawings, Fig. 1 is a plan view of the entire bearing, illustrating the relative disposition of the sections forming the cage as well as the normal eccentric relation of the cage sections; Fig. 2 a vertical transverse sectional view taken on the line II—II, Fig. 1; and Fig. 3 an end elevation of the parts illustrated in Fig. 2.

The bearing comprises the lower and upper cage sections indicated generally at 1 and 2 respectively, with a cylindrical or other suitably shaped roller 3 interposed therebetween. Each of the cage sections is U-shaped in cross section, as clearly shown in the drawings, and is preferably fabricated by the process of rolling, which consists in rolling comparatively long channels and subsequently severing the same into suitable lengths for the particular bearing to be constructed. The lower cage section 1 consists of a lower bearing surface or wear plate 4 having the integrally formed channel legs 5, 5', which serve as end walls for the cage. The lower surface 4 is preferably inclined downwardly from its opposite extremities, as shown at 6, 6', towards an intermediate flat portion 7 for the purpose of rendering the roller 3 self-centering. The lower cage section is mounted upon the truck bolster 8 in any suitable manner as by means of the rivets 9, 9', the floor of the channel section being recessed immediately adjacent the end walls 5, 5', whereby to position the heads of the rivets at a point to offer no obstruction to the movement of the roller throughout its entire travel, that is, to the extreme position indicated by the dotted lines 3'.

The upper cage section 2 is also preferably fabricated by rolling, as above described, and consists of the floor portion 10 providing the upper bearing surface or wear plate and the leg portions 11, 11' forming the side walls of the cage. The upper cage section is suitably attached to the car body. One method of attaching the upper section of the cage to the car body is by riveting or bolting the same to the body bolster, suitable apertures being provided for such purpose as indicated at 12, 12'.

In mounting the respective sections forming the bearing cage, the upper cage section 2 is attached to the car body at a point nearer the longitudinal axes of the car body and truck than the point of attachment for the lower cage section 1, thus disposing the two cage sections eccentrically with respect to each other, as clearly shown in Fig. 1 of the drawings. The distance between the side walls 11, 11' is slightly greater than the length of the roller 3 whose length in turn is somewhat greater than that of the end walls 5, 5', so that when the two cage sections are arranged with their axes at substantially right angles to each other, the upper cage section will embrace not only the roller 3 but the upstanding end walls 5, 5', of the lower cage section, as clearly indicated in Figs. 2 and 3, the normal relative positions of the parts being shown therein with the upper bearing surface out of contact with the roller thereby permitting the roller to move to its centered position.

It is noted that each of the cage sections consists of an integral construction forming one of the bearing surfaces and two of the confining walls of the cage, being otherwise entirely open at the sides or ends thus permitting free escape of dirt and foreign matter from the several parts and rendering the bearing self-cleaning.

In operation, the upper bearing surface 10 is normally out of contact with the roller 3 which remains in its centered position as shown in Fig. 2. Whenever the car body sways sufficiently, as in rounding curves, the bearing surface 10 is brought into contact with the roller 3, and during subsequent swiveling movement between the truck and car body the roller will be forced to travel along the lower bearing surface 4 towards the end wall 5 or 5' in a well known manner immediately upon lifting movement of the upper bearing surface so as to break contact between it and the roller, the roller immediately returns to its normal centered position due to the downwardly inclined portions 6, 6', causing the roller to rest upon the intermediate flat portion 7.

It has been found in devices of this character, due partly to the relative play in the mountings between the truck and car body, that when the upper bearing surface first contacts the roller, there is a tendency to move the roller outwardly away from the central longitudinal axes of the truck and car body. In order to compensate for this movement, as well as to provide means for positioning the roller more nearly symmetrically upon its lower bearing surface during the swiveling movement between the truck and car body, the upper cage section is disposed at a point upon the car body somewhat nearer its longitudinal center than the location of the lower cage section. This eccentric disposition of the two sections of the cage, as clearly shown in Figs. 1 and 3, causes the roller 3 to be moved slightly from the position shown in Fig. 3 towards the left, as viewed in said figure, thereby disposing the roller more nearly symmetrically with respect to the end walls 5, 5' and the lower bearing surface 4 during the time that the bearing is in actual operation to support the car body during its swiveling movement.

It is thus seen that the invention provides a roller side bearing which is extremely simple in construction, comprises a minimum number of parts, is easy and economical to manufacture, is efficient in operation, is self-cleaning due to the free exposure of the bearing surfaces at the sides or ends, and provides a construction whereby the roller is automatically moved to the most desirable position during its actual operation to secure the best results.

I claim:

1. A roller side bearing for railway cars comprising a cage consisting of two cooperating sections, each section forming a wear plate and a pair of retaining walls, and a free roller interposed therebetween.

2. A roller side bearing for railway cars comprising a cage consisting of two cooperating sections, one section forming a lower bearing surface and end walls fixed to the truck, the remaining section forming an upper bearing surface and side walls fixed to the car body, and a free roller interposed therebetween.

3. A roller side bearing for railway cars comprising a cage consisting of two U-shaped channel sections, each providing a bearing surface and two confining walls, and a free roller interposed therebetween.

4. A roller side bearing for railway cars comprising a cage consisting of two U-shaped rolled channel sections, each providing a bearing surface with two confining walls formed integrally therewith, and a free roller interposed between the sections.

5. A roller side bearing for railway cars comprising a cage consisting of two rolled U-shaped channel sections, said sections being attached to the truck and car body respectively, and arranged at substantially right angles to each other and with the one partially embracing the other, and a free roller interposed between the sections.

6. A roller side bearing for railway cars comprising a U-shaped channel section providing a lower bearing surface fixed to the truck bolster, a similarly shaped channel section providing an upper bearing surface and two side walls fixed to the car body, the two sections being mounted eccentrically with respect to each other with the last named section disposed near the central longitudinal axis of the truck and car body and with the said side walls embracing the said end walls, and a free roller interposed between the said sections.

In testimony whereof, I sign my name.

ARNOLD STUCKI.

Witness:
EDWIN O. JOHNS.